ATTENUATED LIVE RUBELLA VIRUS VACCINE AND METHOD OF PRODUCTION

Filed Dec. 20, 1966

INVENTORS,
HARRY M. MEYER, JR.
PAUL D. PARKMAN
BY Jacobi & Davidson
ATTORNEYS

INVENTORS,
HARRY M. MEYER
PAUL D. PARKMAN
BY Jacobi & Davidson
ATTORNEYS

United States Patent Office 3,651,212
Patented Mar. 21, 1972

3,651,212

ATTENUATED LIVE RUBELLA VIRUS VACCINE AND METHOD OF PRODUCTION

Harry M. Meyer, Jr., Silver Spring, and Paul D. Parkman, Kensington, Md., assignors to the United States of America as represented by the Secretary of the Department of Health, Education, and Welfare Filer Dec. 20, 1966, Ser. No. 603,239
Int. Cl. C12k 5/00, 7/00
U.S. Cl. 424—89 8 Claims

ABSTRACT OF THE DISCLOSURE

Production of an antigenically active, attenuated, live rubella virus vaccine by introducing a virulent live rubella virus into a monkey kidney tissue cell culture, incubating the tissue cell culture at a temperature compatible with growth of the tissue and the virus, harvesting a portion of the virus so-produced and reintroducing said harvested virus into fresh cultures, and repeating the tissue culture passages of the virus serially for a sufficient number of passages to produce the antigenically active, noncommunicable, live rubella virus and then forming a vaccine therefrom.

This invention is concerned with the production of an antigenically active, attenuated, live rubella virus vaccine.

The rubella virus infection, commonly known as German measles, is primarily a disease of children and young adults and is clinically characterized by sore throat, coryza, headache, malaise, myalgia, posterior cervical lymphadenitis and a pale pink macular rash. Accurate information on the incidence of the disease is not available because study has been limited by the virus' restrictive host range (humans and monkeys) and by the difficulty in diagnosing so mild a disease. It has been established, however, that occurrence of rubella infection is world-wide.

Rubella infection is highly contagious. The virus is probably communicated via the respiratory route by close personal contact and is usually detectable both in the blood and in nasopharyngeal washings.

The usual course of the disease leads to prompt and complete recovery though relapse occurs in 5–8 percent of the cases. Secondary bacterial infections are rare as are other complications which include arthralgia, neuritis, gingivitis, thrombocytopenic purpura and heart block. Meningoencephalitis occurs in one of every 6,000 cases and is 20 percent fatal. A patient who has contracted and has recovered from a rubella infection usually enjoys lasting immunity from subsequent attacks.

The most dismal aspect of this disease is that it is the only viral infection proven to be associated with fetal abnormalities in cases where a pregnant woman contracts the disease in her first trimester of pregnancy. Though it is not true, by any means, that abnormalities always result in the offspring of a first-trimester infected pregnant woman (she has a 90 percent chance of bearing a normal baby), when abnormalities do occur they are frequently so severe as to lead to intrauterine fetal death, stillbirth, or delivery of a viable infant with tragic defects such as microencephaly, dental hypoplasia, blindness due to cataract formation, deafness due possibly to agenesis of the Organ of Corti and acyanotic cardiovascular disease such as patent ductus arteriosus and intraventriculas septal defects.

Since rubella frequently infects young adults, there is a real danger of its occurrence during pregnancy. Motivated by the severity of this problem, a great deal of work has been done in attempting to confer immunity on susceptible individuals. Early approaches toward the production of a killed-virus vaccine were unsuccessful. Further, various tissue culture propagated live rubella viruses produced prior to the instant development were also unsuccessful. Previously tested live-virus vaccines have not been able to stimulate the immuno logic mechanism of an inoculated individual without producing the ordinary side effects of clinical rubella including the appearance of the rash and the spread of the disease to uninoculated persons.

Thus, the basic object of this invention is the production of an attenuated live rubella virus vaccine which retains its antigenic properties and is capable of providing immunity to reinfection to an inoculated, otherwise susceptible, individual without producing undesirable reactions ordinarily associated with contagious rubella. Further, a primary object of this invention is to provide a method for attenuating live rubella virus and for prepai ing a vaccine therefrom in an efficient and reproducible manner.

A corollary to the aforementioned objectives of this invention is the development of laboratory marker techniques useful in detecting modification of a rubella virus strain before its clinical trial in man whereby attenuation of the virus will be signalled by the presence of such changes in virus behavior.

Other objects will in part be obvious and in part be pointed out as the description of the invention proceeds and as shown in the accompanying drawings wherein.

Figure 1:
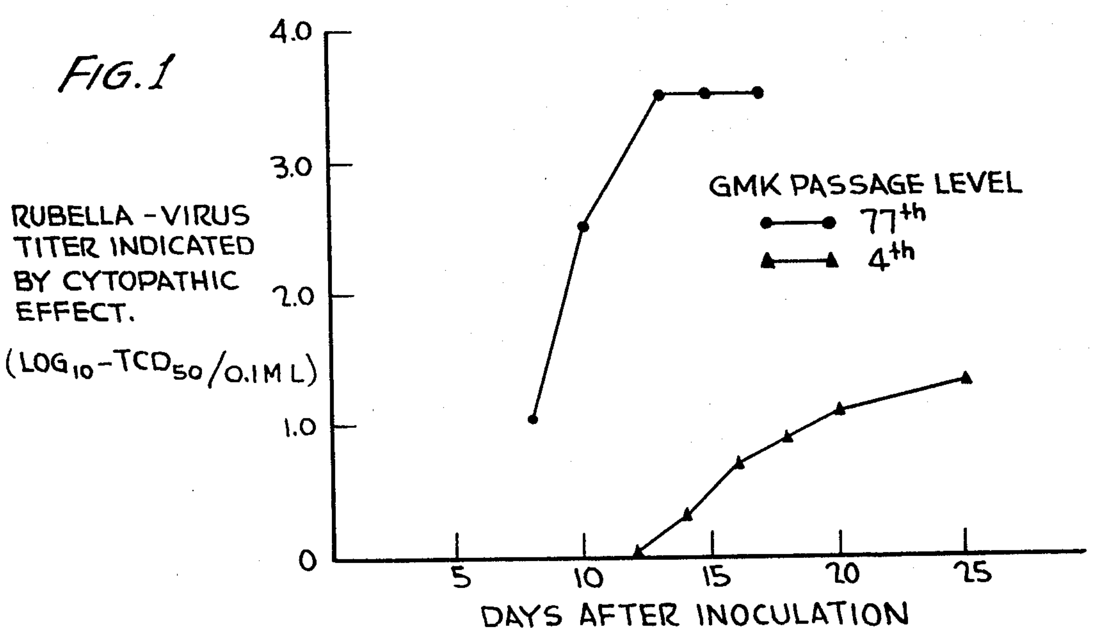
FIG. 1 is a graph showing the effect of low and high passage level rubella virus on cytopathic changes in $RK_{13}$ rabbit kidney cells, one of the "marker" techniques utilized in developing the vaccine of the instant invention.

In order to distinguish an attenuated rubella virus produced according to this invention from an unmodified, natural rubella virus, the latter will be referred to herein and in the appended claims as "virulent." Further, persons identified herein as "susceptible" to rubella are those having no detectable neutralizing antibody of rubella.

Having now provided a definition for certain key terms employed in this description, reference will now be made to the basic laboratory techniques utilized in the production of an attenuated live rubella virus vaccine according to this invention.

Virulent rubella virus strains, both M–33 and ML, were recovered from throat washings of patients with typical clinical rubella. Both viruses were subjected to several levels of tissue-culture passage, the M–33 strain being passed over 100 times and the ML strain being passed 70 times. The two rubella virus strains were serially subcultured in primary African green monkey kidney cells (GMK), supernatant fluids and cells from the rubella-infected cultures being passed at intervals of seven to nineteen days. Although reference will be made herein to both the M–33 and the ML strains, primary emphasis will be directed to the use of the M–33 strain since the original development utilized this material. However, various test results will be reported hereinafter evidencing the production of an attenuated virus from the ML strain as well as from the M–33 strain.

The techniques utilized for producing and safely testing a live virus vaccine from the M–33 rubella strain were as follows:

VIRUS (a) *Seed strain.*—The virulent M–33 virus strain was recovered from an Army recruit with rubella at Fort Dix, New Jersey. This recruit had a mild illness lasting three days with generalized rash and posterior cervical lymphadenopathy. The patieint had a low-grade fever for one day.

Throat swabs were negative for $\beta$-hemolytic streptococci. Throat washings yielded an interfering agent in GMK. In subsequent studies, this virus was shown to be the etiologic agent of rubella.

(b) *Passage history.*—The rubella virus was recovered in GMK and subsequently, serially passaged in this cell type 77 times. Ordinarily, in these passages, 0.2 ml. of undiluted supernatant fluids and scraped cells were subcultured at 7 to 10 day intervals in cultures maintained at 35° to 36° C. in stationary racks. Exceptions to this procedure were made at the 5th–6th and 69th–73rd and 75th passage levels. The 5th and 6th were incubated at 32° C. in roller drums and the 69th–73rd and 75th passage levels were made as limiting infectious dilutions for purification.

The high passage modified virus which forms the basis of most of the clinical trials reported hereinafter has been designated HPV–77.

(c) *Tests on seed.*—The seed virus pool used for the inoculation of tissue cultures for vaccine production was shown to be free of demonstrable extraneous, viable agents by tests in tissue cultures to exclude cytopathic viruses, and in appropriate media to exclude bacteria, fungi and pleuropneumonia-like organisms (PPLO).

PREPARATION OF LIVE RUBELLA VIRUS VACCINE (a) *Facilities and personnel.*—All processing steps up to and including filling into final containers of the rubella virus seed pool and vaccine were performed in a cubicle which formed an independent unit in a room. Prior to use for this purpose, the area was decontaminated and the cubicle was not used for any other purpose during preparation of the vaccine.

On days when the vaccine was being processed, personnel avoided work with other infectious agents. Face masks and gowns were worn in the vaccine processing unit.

(b) *Tissue culture production, maintenance and inoculation.*—Tissue cultures for vaccine production were prepared from kidneys of African green monkeys, guarantined and tuberculin tested. Culture vessels (32 oz. prescription bottles) were seeded with trypsinized suspensions of grivet monkey kidney containing 300,000 viable cells per ml. in Hank's lactalbumin hydrolysate medium with 5 percent calf serum (inactivated at 56° C. for 30 minutes prior to use). Three days after seeding, the vessels were changed with 35 ml. Eagle's minimum essential medium (MEM) [1] containing 5 percent fetal bovine serum and neomycin, 25 mg./ml. When cell moonlayers were confluent (6 days after seeding) the vessels were re-fed with maintenance medium consisting of MEM, 1 percent fetal bovine serum and the same concentrations of neomycin.

After observation for three days, the supernatant fluids were drawn off and pooled for the safety tests applied to pre-inoculation culture fluids (see below). Each vessel was then re-fed with 35 ml. of maintenance medium. Twelve of the cultures were inoculated with 1 ml. each of a 1:10 dilution of the primary seed virus and the remaining six were held as uninoculated cell controls. All cultures were incubated at 35° C.

(c) *Vaccine harvest.*—On the 7th day after inoculation, all cultures were washed three times with Hank's balanced salt solution (BSS) [2] to reduce the serum protein concentration to less than 1 part per million, and re-fed with medium 199 (M–199) [3] with 25 mg./ml. neomycin.

[1] MEM composition as follows:

| | Gm./liter |
|---|---|
| 1-arginine HCl | 0.1264 |
| 1-cystine | 0.024 |
| 1-glutamine | 0.292 |
| 1-histidine | 0.031 |
| 1-isoleucine | 0.052 |
| 1-leucine | 0.052 |
| 1-lysine HCl | 0.073 |
| 1-methionine | 0.015 |
| 1-phenylalanine | 0.032 |
| 1-threonine | 0.048 |
| 1-tryptophan | 0.01 |
| 1-tyrosine | 0.036 |
| 1-valine | 0.046 |
| | Mg./liter |
| Choline chloride | 1.0 |
| Folic acid | 1.0 |
| Nicotinamide | 1.0 |
| Ca pantothenate | 1.0 |
| Pyridoxal HCl | 1.0 |
| Thiamine HCl | 1.0 |
| Riboflavin | 0.1 |
| i-Inositol | 2.0 |
| | Gm./liter |
| Nacl | 6.8 |
| KCl | 0.4 |
| $NaH_2PO_4H_2O$ | 0.15 |
| $NaHCO_3$ | 2.2 |
| $CaCl_2$ | 0.2 |
| $MgCl_26H_2O$ | 0.2 |
| Dextrose | 1.0 |
| Phenol Red w.s. | 0.005 |

[2] BSS composition as follows:

| | Gm./liter |
|---|---|
| NaCl | 8.0 |
| KCl | 0.4 |
| $MgSO_47H_2O$ | 0.1 |
| $MgCl_26H_2O$ | 0.1 |
| $CaCl_2$ | 0.15 |
| $Na_2HPO_412H_2O$ | 0.152 |
| $KH_2PO_4$ | 0.06 |
| Dextrose | 1.0 |
| Phenol Red | 0.02 |
| $NaHCO_3$ | 0.35 |
| Sterile DM Dist. $H_2O$ to 1,000 ml. | |

[3] M–199 composition as follows:

| | |
|---|---|
| 1-arginine | 0.07 |
| 1-histidine | 0.02 |
| 1-lysine HCl | 0.07 |
| dl-Tryptophate | 0.02 |
| dl-Phenylalanine | 0.05 |
| dl-Methionine | 0.03 |
| dl-Serine | 0.05 |
| dl-Threonine | 0.06 |
| dl-Leucine | 0.12 |
| dl-Isoleucine | 0.04 |
| dl-Valine | 0.05 |
| dl-Glutamic acid | 0.15 |
| dl-Aspartic acid | 0.06 |
| dl-Alanine | 0.05 |
| 1-proline | 0.04 |
| 1-hydroxyproline | 0.01 |
| Glycine | 0.05 |
| 1-glutamine | 0.10 |
| Na acetate | 0.05 |
| 1-tyrosine | 0.04 |
| 1-cystine | 0.02 |
| Niacinamide | $2.5\times10^{-5}$ |
| Niacin | $2.5\times10^{-5}$ |
| Pyridoxine HCl | $2.5\times10^{-5}$ |
| Pyrodoxal HCl | $2.5\times10^{-5}$ |
| Thiamine HCl | $1.0\times10^{-5}$ |
| Riboflavin | $1.0\times10^{-5}$ |
| Ca pantothenate | $1.0\times10^{-5}$ |
| i-Inositol | $5.0\times10^{-5}$ |
| p-Aminobenzoic acids | $5.0\times10^{-5}$ |
| Choline chloride | $5.0\times10^{-4}$ |
| Biotin | $1.0\times10^{-5}$ |
| Folic acid | $1.0\times10^{-5}$ |
| Calciferol (vit. $D_2$) | $1.0\times10^{-4}$ |
| Cholesterol | $2.0\times10^{-4}$ |
| Sorbitan mono-oleate (Tween 80) | 0.02 |
| d-Alpha tocopherol acetate (vit. E) | $1.0\times10^{-5}$ |
| Vitamin K | $1.0\times10^{-5}$ |
| Adenine sulphate | 0.01 |
| Xanthine | $3.0\times10^{-4}$ |
| Hypoxanthine | $3.0\times10^{-4}$ |
| Thymine | $3.0\times10^{-4}$ |
| Uracil | $3.0\times10^{-4}$ |
| Guanine | $3.0\times10^{-4}$ |
| d-a-Desoxyribose | $5.0\times10^{-4}$ |
| d-Ribose | $5.0\times10^{-4}$ |
| Adenylic acid | $2.0\times10^{-4}$ |
| Ferric nitrate ($Fe(NO_3)\cdot9H_2O$) | $1.0\times10^{-4}$ |
| Cysteine HCl | $1.0\times10^{-4}$ |
| Glutathione | $5.0\times10^{-5}$ |
| Ascorbic acid | $5.0\times10^{-5}$ |
| Vitamin A | $1.0\times10^{-4}$ |
| Ethyl alcohol (EtOH), ml. | 0.201 |
| Adenosine triphosphate (ATP) | 0.01 |
| NaCl (biol. grade) | 8.0 |
| KCl | 0.4 |
| $MgSO_4\cdot7H_2O$ | 0.2 |
| $Na_2HPO_4$ (anhydrous) | 0.06 |
| $KH_2PO_4$ | 0.06 |
| Dextrose | 1.0 |
| Phenol Red | 0.02 |
| $CaCl_2$ (anhydrous) | 0.14 |
| $NaHCO_3$ | 1.25 |
| 0.075 normal HCl, ml. | 20.0 |

One day later, and for a total of 7 days, harvests were collected at 24 hour intervals and after each harvest, the cultures were re-fed with fresh M–199. Processing of viral vaccine fluids was under aspetic conditions. Samples from each harvest were removed for microbial sterility tests and infectivity titration, and the remainder of the pool was frozen at −70° C. Supernatant fluids from uninoculated control vessels were similarly harvested and stored. Aliquots of the harvests of inoculated and control vessels collected from the 8th day to the 15th day after inoculation were separately pooled and safety tested. The rubella virus pool (formed from aliquots of the individual virus harvests) was thawed and clarified by centrifuge for 20 minutes at 2000 r.p.m. Normal serum albumin (human) salt poor was added as a stabilizer to a final concentration of 2 percent. This final bulk material was dispensed into individual containers which were immediately frozen at −70° C. and labeled for various tests.

With regard to the above preferred technique for producing an attenuated live rubella virus vaccine, it is to be understood that certain changes may be made without departing from the scope of the instant invention. For example, although primary African green monkey kidney cell cultures were utilized, other cultures which are capable of supporting growth of the virus may be substituted therefor including, but not necessarily limited to, rhesus monkey kidney cell cultures, human embryo kidney cell cultures, rabbit kidney cell cultures, avian embryo cell cultures and diploid cell cultures. Also, although incubations were carried out at about 35° C., it should be understood that the temperature may vary with the tissue culture system, and the basic requirement is that the cultures be incubated at a temperature compatible with growth of the tissue and the virus. Similarly, the harvesting intervals should provide adequate opportunity for growth of the virus and the various nutrients should be suitable for sustaining the virus growth. Various purifying and stabilizing techniques well known in the art may be utilized in the production techniques and concentration of the virus for vaccine preparation may be accomplished in any desired manner.

TESTS FOR SAFETY

The live rubella virus vaccine was tested for safety in accordance with the Public Health Service Regulations Title 42, Part 73, for live, oral poliovirus and live, attenuated measles virus vaccines.

(a) *Tests performed on pre-inoculation culture supernatants and uninoculated control tissue culture fluids.*—Supernatant fluids from the pre-inoculation harvest and the pooled control fluid harvests were inoculated into primary grivet and rhesus monkey kidney, human embryo kidney and rabbit kidney cell cultures. A total of 20 ml. of fluid was inoculated into 20 tubes of each tissue culture cell type. These cultures were observed for cytopathic effect, tested for hemadsorption and the human and simian cultures challenged with echovirus type 11 for evidence of interfering agents. All safety tests were observed for a minimum of 40 days including initiation of the cell cultures used for vaccine production. To achieve this observation period, subpassage of the pre-inoculation fluid harvest was maintained for 30 days and the pooled control fluid harvests for 17 days.

No cytopathic, hemadsorbing or interfering agents were detected in any of these cell cultures and the tests were judged to be satisfactory.

(b) *Tests performed on vaccine prior to clarification.*—Aliquots from each of the seven daily harvests were thawed, pooled, cultured for microbial sterility and titrated for rubella virus infectivity on the day of safety testing.

(i) Animal inoculation

*Rabbits.*—15 healthy, 1500–2500 gm. rabbits were each inoculated with 0.1 ml. of vaccine intradermally, in 10 sites and subcutaneously with 4.5 ml. in each of 2 sites. All of the rabbits remained healthy throughout the 21 day test period. No lesions were observed at the sites of inoculation and there was no evidence of $\beta$-virus or any other viral infection.

*Adult mice.*—Thirty adult mice (15 to 20 gm.) were inoculated intraperitoneally with 0.5 ml. and intracerebrally with 0.03 ml. of vaccine. All survived the 21 day test period. None of the mice showed evidence of lymphocytic choriomeningitis virus or other virus infection.

*Suckling mice.*—Each of 29 suckling mice less than 24 hours old were inoculated intracerebrally with 0.01 ml. and intraperitoneally with 0.1 ml. of the vaccine. The litters were observed daily for 14 days. All 29 mice survived the test. A blind passage of pooled, emulsified tissues (minus skin and viscera) from the surviving animals was made in additional suckling mice, by intracerebral and intraperitoneal routes and these animals were observed for an additional 14 days. None evidenced symptoms suggestive of virus infection.

*Guinea pigs.*—Each of 10 guinea pigs (350–450 gm.) was inoculated intracerebrally with 0.1 ml. and intraperitoneally with 5.0 ml. of the vaccine. The animals were observed 42 days. There was no evidence of a transmissible agent attributable to the vaccine.

(ii) Tissue culture inoculation

Primary grivet and rhesus monkey kidney, human embryo kidney and rabbin kidney culture vessels (32 oz.) containing 40 ml. of maintenance medium were each inoculated with an equal volume of vaccine and observed for 14 days for evidence of transmissible agents. The total volume of vaccine inoculated into each cell type was:

| | Ml. |
|---|---|
| Primary grivet kidney | 280 |
| Primary rhesus kidney | 320 |
| Human embryo kidney | 390 |
| Primary rabbit kidney | 600 |

No cytopathic agents were detected in any of the cultures.

(iii) Tests for pleuropneumonia-like organisms (PPLO)

Tests for PPLO were performed in accordance with regulations for live, attenuated measles virus vaccine (PHS Regulations para. 73.152 ii). There was no evidence of PPLO.

(iv) Bacteriological tests

The vaccine was cultured in thioglycollate and Sabouraud's broth for evidence of contamination with bacterial and fungal agents. Each medium was inoculated with a total of 20 ml. of the vaccine pool. Thioglycollate broth cultures were incubated for 7 days at 32° C.; Sabouraud's broth at room temperature (21° to 25° C.) for 10 days. No evidence of bacterial or fungal growth was observed in thioglycollate broth when examined on the 3rd and 7th days or in Sabouraud's broth on the 10th day. These tests are satisfactory.

Tests for Mycobacterium tuberculosis were performed on the sediment produced by centrifugation of 20 ml. of the bulk sample for 20 minutes at 2500 r.p.m. The sediment was resuspended in 0.5 ml. of supernatant. Four Lowenstein-Jensen agar slants were each inoculated with 1 loopful of this concentrate; four agar slants with 5 percent human blood were each inoculated and streaked with 0.1 ml. Cultures were incubated at 35° C. There was no evidence of bacterial growth.

(c) *Tests performed on vaccine after clarification.* (i) *Tissue culture inoculation of virus pool after neutralizing with specific antiserum.*—Equal volumes of the virus pool clarified by centrifugation and neutralized by specific rubella virus antiserum (rabbit) diluted in Hank's BSS containing 10 percent normal rabbit serum, were incubated at room temperature for one hour. One ml. of the neutralized mixtures and vaccine incubated similarly with diluent alone were inoculated into primary grivet and rhesus monkey kidney, human embryo kidney and rabbit kidney cultures grown in screw cap tubes. These cultures and uninoculated cell controls were observed for cytopathic agents for 14 days. At the end of the test period, one half of each group of cultures was challenged with echovirus type 11. The final results were fully satisfactory.

(ii) *Neurovirulence safety test in monkeys for neurotropic agents (with cortisone).*—Tests for neurovirulence in cortisone-injected monkeys were conducted in accordance with the PHS regulations (73.102e), also producing fully satisfactory results.

(iii) *Neurovirulence safety test of virus strain.*—Studies for the detection of neurovirulence in rubella-susceptible monkeys were conducted. The clarified bulk virus was inoculated into 20 rhesus monkeys via the intrathalamic (0.5 ml. bilaterally) and intracisternal routes (0.25 ml.).

Ten animals were sacrificed 21 days after inoculation and their central nervous system tissues examined for presence of histopathological abnormalities. The remaining 10 monkeys were each caged with an animal similarly inoculated with uninfected control fluids from the same lot of tissue culture used for vaccine production. Five additional control animals (unnoculated) were caged adjacent to the inoculated animals. Detailed virologic studies were done on these additional animals and produced fully satisfactory results.

FINAL CONTAINER TESTS (a) *Potency tests.*—The vaccine was tested for potency by titration of infectivity in primary grivet monkey kidney cell cultures. Individual vials of final container vaccine were thawed and diluted serially in 0.5 log steps from $10^{2.5}$ to $10^{-5.0}$; 0.1 ml. of each dilution was inoculated into each of five tube cultures. Cultures were incubated at 35° C. Medium was changed at 5 and again at 10 days when the cultures were tested for evidence of interference wtih echovirus type 11. Interference endpoints were calculated by the Karber method and adjusted to the number of 50 percent interfering doses ($InD_{50}$) per 0.5 ml. The final container virus titer was $10^{-4.4}$ $InD_{50}$/0.5 ml.

(b) *General safety tests.*—Two 350–450 gm., Hartley strain guinea pigs were each inoculated intraperitoneally with 5 ml. of vaccine. Two adult, white mice were similarly inoculated, each with 0.5 ml. All animals survived a 7 day observation period without signs of illness.

(c) *Sterility.*—The contents of 20 final containers were each inoculated into 500 ml. of thioglycollate broth; incubated at 32° C. and observed 7 days for evidence of microbial growth.

The same volume of final container material was tested in Sabouraud's broth. On completion of the observation period, fully satisfactory results were realized.

(d) *Identity.*—Undiluted and $10^{-1}$ dilutions of final container vaccine were mixed with equal volumes of serial two-fold dilutions of heat-inactivated rubella antiserum (rabbit) or normal rabbit serum. These serum-virus mixtures were incubated for one hour at 37° C. and inoculated into each of three grivet monkey kidney tube cultures. Appropriate controls were included. Neutralization of the virus in the vaccine constituted proof of its identity.

Thus, it will be seen that the resultant vaccine satisfied all of the laboratory safety tests. The passage history set forth above, while preferred, is not to be considered limiting on the instant inventive concepts. Similar techniques are utilized in the production of a live rubella virus vaccine from the ML strain and similar results are realized.

At intervals of 10 to 20 passages the above viruses were examined for indication of a change in their biologic characteristics. To preclude the necessity for clinical trials of vaccine which had not been properly attenuated, the following in vitro "marker" techniques were utilized to evidence the presence of virus modification:

*Cytopathic effect (CPE) in $RK_{13}$ cells.*[4]—The first "marker" is the production of a cytopathic effect with the virus in $RK_{13}$ cells. Rubella viruses do not produce extensive cell destruction in most tissue-culture systems. Ordinarily, presence of rubella virus is detected by its capacity to interfere with superinfection by a second virus, and this property of interference has been used as a standard technique for quantitative titration of rubella-virus infectivity. However, rubella virus will produce rapid and complete cytopathic changes in $RK_{13}$ cell cultures, but only after 3 to 10 passages in homologous cells. In this system, infectivity can be expressed in terms of cytopathic change ($TCD_{50}$). It was, therefore, surprising that high GMK passage levels of rubella virus produced degenerative changes in the heterologons $RK_{13}$ cell system [5] upon first passage. This unique characteristic of the high-passage virus provided one of the laboratory "markers."

Comparisons were made of the ability of several rubella-virus passage levels to produce CPE in $RK_{13}$ cells incubated at 35° C. An illustrative titration showing time of appearance and rate of development of cytopathic change is presented in FIG. 1. Both fourth and seventy-seventh passage level preparations contained $10^{3.5}$ $InD_{50}$ per 0.1 ml. when titrated in GMK cells with the use of the standard interference technique. As will be seen from FIG. 1, virus in seventy-seventh passage (HPV–77) first produced cytopathic changes at eight days and showed a titer of $10^{-3.5}$ per 0.1 ml. by thirteen days. In contrast, cytopathic changes produced by fourth-passage virus occurred much later and progressed slowly. Even after twenty-five days of incubation the cytopathic end-point titer of $10^{-1.3}$ $TCD_{50}$ per 0.1 ml. was more than a hundred times less than the infectivity titer obtained by measurement of interference ($InD_{50}$).

Table I presents further data concerning the comparative titration of several passage levels of the M–33 and ML strains in GMK and $RK_{13}$ cell cultures.

TABLE I

| Virus-passage level[a] | $RK_{13}$ cultures,[b] $TCD_{50}$ | GMK cultures,[c] $InD_{50}$ |
|---|---|---|
| M-33 strain: | | |
| 2 | 2.3 | 3.5 |
| 3 | ≤0.5 | 4.5 |
| 4 | 2.3 | 4.5 |
| 9 | ≤1.1 | 3.5 |
| 22 | 4.1 | 3.7 |
| 23 | 4.5 | 2.7 |
| 35 | 4.7 | 3.9 |
| 60 | 5.7 | 3.1 |
| 68 | 4.1 | 3.5 |
| 74 | 3.5 | 2.0 |
| 77 | 4.9 | 3.3 |
| 90 | 4.1 | 3.1 |
| 100 | 4.3 | 4.3 |
| ML strain: | | |
| 0 [d] | ≤0.5 | 1.9 |
| 5 | ≤1.5 | 2.3 |
| 20 | 4.1 | 3.5 |
| 40 | 3.7 | 2.7 |
| 66 | 3.5 | 2.3 |

[a] Cell-culture passage level of virus in African green monkey kidney cells.
[b] $Log_{10}$ tissue culture cytopathic $dose_{50}$/1.0 ml.
[c] $Log_{10}$ tissue culture interfering $dose_{50}$/1.0 ml.
[d] Throat washing from ML.

Virus preparations were titrated by the usual methods.[6]

[4] A continuous rabbit kidney cell line contaminated with a PPLO. See McCarthy et al., "Isolation of Rubella Virus from Cases in Britain," Lancet, vol. 2, pp. 593–598, 1963.

[5] $RK_{13}$ maintained with M–199 containing 0.4 percent bovine plasma albumin (BPA) and antibiotics (penicillin, 100 units and streptomycin, 100 g. per ml.) incubated at 33 or 35° C.

[6] Diagnostic Procedures for Viral and Rickettsial Diseases, third ed., Lennette et al., American Public Health Assn., Inc., p. 111, 1964.

Five to ten tube cultures of GMK or $RK_{13}$ cells were each inoculated with 0.1 ml. of serial tenfold dilutions made in Hank's BSS containing 1 percent BPA. Titrations in GMK were tested for evidence of rubella-virus interference with Echovirus Type 11 (E–11) after ten days; $RK_{13}$ cells were observed for cytopathic effect (CPE) for twenty to twenty-one days. Fifty percent end points were calcuated by the Karber methods [7] and were expressed as the interfering $dose_{50}$ ($InD_{50}$) or the tissue-culture cytopathic $dose_{50}$ ($TCD_{50}$).

The relatively constant interference titers observed indicated no apparent change in behavior of the viruses as a result of continued passage. However, in $RK_{13}$ cultures in which end points were based on appearance of CPE ($TCD_{50}$) striking differences were noted between low-passage and high-passage viruses. At GMK passage levels 2, 3, 4 and 9 the onset and progression of CPE were delayed in a pattern similar to that seen in FIG. 1, and the cytopathic end-point titers were consistently lower (1.3 to 4.0 $log_{10}$ units) than the comparable interference titration value. At higher passage levels (twenty-second for M–33 strain virus and twentieth for ML strain) this relation was altered so that titers indicated by the cytopathic system were always equal to or higher than those shown by the interference method. The period before onset of CPE was related to passage level; in 2 experiments cytopathic changes in cultures inoculated with sixtieth-passage levels appeared and progressed to completion three to five days earlier than twentieth or fortieth passages of the same virus strains. Additional decreases in this period, as the number of passages increased from 60 to 100, were not apparent.

Thus, this technique provides a first signal of virus modification.

*Plaque formation in $RK_{13}$ cells.*—The second of the laboratory "markers" utilized according to this invention is the formation of plaques in $RK_{13}$ cells. Several GMK passage levels of strain M–33 and ML were titrated by the interference technique and by plaque formation in $RK_{13}$ cells. A comparison of the values obtained is shown in the experiments summarized in Table II.

TABLE II

| Virus-passage level [a] | $RK_{13}$ cultures,[b] PFU ($log_{10}$) | GMK cultures,[c] $InD_{50}$ |
|---|---|---|
| M–33 strain: | | |
| 5 | <0.0, <0.0 | 2.3, 4.1 |
| 17 | <0.0 | 3.5 |
| 23 | <0.0 | 3.7 |
| 63 | 2.4 | 4.1 |
| 74 | 2.8, 3.5 | 4.1, 4.7 |
| ML strain: | | |
| 0 [d] | <0.0 | 0.7 |
| 5 | <0.0 | 2.5 |
| 20 | 2.8 | 4.5 |
| 40 | 2.9 | 4.3 |

[a] Cell-culture passage level of virus in African green monkey kidney cells.
[b] $Log_{10}$ plague-forming units (PFU)/0.2 ml.
[c] Tissue-culture interfering $dose_{50}$ ($InD_{50}$)/0.2 ml.
[d] Throat washings from ML.

Rubella-virus plaque formation was assayed in $RK_{13}$ cells; cultures received 0.2 ml. volumes of serial 0.5 $log_{10}$ dilutions. After adsorption for one hour, inocula were removed, and the cultures overlayed with agar medium.

Again, both strains behaved differently at low-passage and high-passage levels. The M–33 strain in the fifth to the twenty-third passage and the ML strain in either throat washing or fifth passage failed to produce plaques. Higher passage levels of both virus strains produced discrete, round plaques approximately 2 mm. in diameter after ten to fourteen days. In these experiments, 16 to 30 $InD_{50}$ were required to produce 1 PFU. It is of interest that whereas twenty-third-passage M–33 virus produced marked cytopathic change in $RK_{13}$ cultures (Table I), plaque formation was not observed.

[7] Taylor-Robinson et al., "Plaque Formation by Rubella Virus," Lancet, vol. 1, p. 1364, 1964.

This "marker" provides yet another signal of virus modification.

*Interferon production.*—The third "marker" technique involved the production of interferon.

Assays of culture fluids of GMK cell cultures infected with fourth-passage and seventy-fourth-passage rubella virus rendered free of infectious virus by acidification to pH 1.0 were found to contain interferon. In preliminary experiments cultures infected with virus of either low or high passage produced interferon; however, the titers induced by the high-passage virus were consistently greater than those by the low-passage virus. Results of a typical experiment are shown in Table III.

TABLE III

| Virus-passage level [a] | Interferon titer in indicated primary cell-culture system [b] GMK | Rabbit kidney |
|---|---|---|
| 4 | 1:12 | <1:4 |
| 74 | 1:32 | 1:32 |

[a] Cell-culture passage level of M–33 strain of rubella virus in GMK.
[b] Interferon activity determined in homologous cell cultures with use of vesicular-stomatitis-virus plague-assay method.

Interferon assays were performed in homologous cell cultures. After twenty-four hours' exposure to the interferon preparations cultures were challenged with approximately 50 plaque-forming units of vesicular-stomatitis virus (VSV). Plaques were counted after forty-eight hours, and the interferon titer was expressed as the dilution resulting in a fifty percent reduction in the number of VSV plaques formed.

Interferon-like substances have been observed in infected primary rabbit-kidney cell cultures. In the experiment shown, detectable interferon was not induced by low-passage virus, but seventy-fourth-passage level induced a titer comparable to that observed in GMK. Other experiments in this system revealed that low-passage virus could induce interferon, but the titers obtained were two-fold to threefold lower than those observed with high-passage material.

Thus, the in vitro "marker" techniques include (1) the production of cytopathic effect in $RK_{13}$ cells, (2) the formation of plaque in $RK_{13}$ cells, and (3) the production of interferon titers in rabbit kidney cells comparable to the titer in GMK. Each of these "markers" in and of themselves will not necessarily produce a clear indication of which material will prove useful as a vaccine, and which will not. However, by observing the results of all three tests, those skilled in the art will be provided with an indication of virus modification of the type which can be expected to provide an antigenically active, attenuated, live rubella virus vaccine.

In order to support the accuracy of the in vitro "marker" techniques, evidence for modification of rubella viruses was also sought in in vivo systems. Earlier studies indicated that in rhesus monkeys inoculated with rubella virus a characteristic pattern of infection developed, thus providing a useful experimental model. Several passage levels of the M–33 and ML virus strains were used to produce experimental infection in animals inoculated intravenously or intramuscularly. Pharyngeal swab, rectal swab and blood specimens were collected at intervals of two or three days for three weeks; serum specimens for antibody determinations were obtained at intervals of two to eight days during the first month after inoculation and then bimonthly or monthly for as long as four months. Monkeys were examined for signs of illness when specimens were collected. None of the animals had clinical signs of rubella.

A comparison of the results of virologic studies on 24 monkeys inoculated parenterally with M–33 virus in third-passage to fifth-passage level and 14 given seventy-fourth passage are presented in Table IV.

TABLE IV

| Virus-passage level[a] | Neutralizing-antibody response: Number positive | Neutralizing-antibody response: Number tested | Virus recovery from— Pharynx: Number positive | Pharynx: Number tested | Blood: Number positive | Blood: Number tested | Rectum: Number positive | Rectum: Number tested | Transmission to cage controls: Number positive | Transmission to cage controls: Number tested |
|---|---|---|---|---|---|---|---|---|---|---|
| M–33 strain: | | | | | | | | | | |
| 3 to 5 | 24 | 24 | 23 | 24 | 12 | 24 | 11 | 24 | 2 | 3 |
| 74 | 13 | 14 | 0 | 14 | 0 | 14 | 0 | 14 | 0 | 14 |
| ML strain: | | | | | | | | | | |
| 0[b] | 3 | 3 | 3 | 3 | 0 | 3 | 0 | 3 | 1 | 2 |
| 5 | 3 | 3 | 2 | 3 | 1 | 3 | 0 | 3 | 0 | 1 |
| 20 | 3 | 3 | 2 | 3 | 1 | 3 | 0 | 3 | 0 | 1 |

[a] Cell-culture passage level of virus in African green monkey kidney cells.
[b] Throat washings from ML.

Neutralizing antibody developed in all 24 animals inoculated with low-passage virus and in 93 percent of those given high-passage virus. The pattern of virus recovery in the 2 groups was strikingly different. Of animals inoculated with third-passage to fifth-passage levels 50 percent (12 of 24) exhibited viremia before the appearance of detectable antibody. Virus excretion from the respiratory tract was demonstrable in 96 percent (23 of 24) of these animals on one or more occasions between the fourth and seventeenth days after inoculation, and rectal excretion of virus was common. The inoculum in these monkeys ranged from $10^{2.4}$ to $10^{4.4}$ $InD_{50}$ of the low-passage virus. In contrast, no virus recoveries were made from animals inoculated with M–33 strain virus in seventy-fourth passage. Of the 14 animals inoculated 9 received $10^{5.5}$ to $10^{6.3}$ $InD_{50}$ intravenously, and 5 were given $10^{3.5}$ $InD_{50}$ intramuscularly. These monkeys did not show viremia or virus excretion from the respiratory or intestinal tract. In each experiment uninoculated monkeys (cage controls) were housed with those inoculated; other susceptible animals were kept in adjacent cages (room controls). Serial serum specimens were obtained from these control animals for at least eight weeks. In general, serologic evidence of contact infection with low-passage virus was observed in 13 to 67 percent of cage control animals; infection of room control monkeys was infrequent. In the experiments shown here, infection was transmitted to 2 of 3 cages mates and 1 of 4 room controls. With high passage virus, experimental infections were not transmissible. None of 14 cage controls had serologic evidence of infection. Moreover, rubella-virus antibody did not develop in 13 other monkeys caged in the same room.

Limited data from studies with the ML strain are shown in the lower portion of Table IV. The ML strain in throat washings, at levels of fifth and twentieth GMK passage, was inoculated intravenously into groups of 3 rhesus monkeys, each animal receiving from $10^{2.6}$ to $10^{3.2}$ $InD_{50}$ of virus. Typical antibody responses developed in all. Virus was recovered from blood and pharyngeal swabs ten to twenty days after inoculation. Each of the animals given throat washings from ML shed rubella virus. Either viremia or presence of virus in the pharynx was observed in all 3 animals given fifth-passage virus, and in 2 of 3 inoculated with twentieth-GMK-passage-level virus. Virus was not recovered from any of the specimens obtained from 1 animal in the last group. None of the rectal-swab specimens collected from the 9 monkeys were positive. Infection was transmitted to the cake control of an animal inoculated with throat washings. Thus, 20 serial passages of the ML strain in GMK cultures failed to produce the definite evidence of modification apparent with seventy-fourth passage-level M–33 strain rubella virus again evidencing the need for high passage level to produce a satisfactory vaccine.

The fact that the "markers" in Tables I and II showed an indication of virus modification with twenty passage level ML strain virus is not contradictory with the instant results. Although virus modification may have begun at this lower level passage, attenuation had not yet been completed. The "marker" techniques evidence this phenomenon by more subtle indications not clearly brought out by the results shown in the tables. For example, as indicated above, in some experiments CPE in cultures inoculated with sixtieth passage level material appeared and progressed to completion substantially earlier than twentieth or fortieth level material of the same strain. Similarly, interferon production increased with passage level indicating additional immunologic response at higher levels.

Other in vivo experiments in rhesus monkeys have been performed to determine if the high-passage rubella virus produced pathologic change in the central nervous system. Seventy-seventh passage rubella virus was inoculated directly into the central nervous systems of 30 monkeys. Ten were inoculated with 0.5 ml. bilaterally into the thalamus and 0.25 ml. intracisternally. Twenty animals, pretreated with cortisone as in the standard neurovirulence testing of attenuated poliovirus-vaccine strains, were given 0.5 ml. bilaterally into the thalamus, 0.5 ml. into the lumbar spinal cord and 1.0 ml. intramuscularly. The titer of this material was $10^{3.9}$ $TCD_{50}$ per 0.5 ml. Animals were observed daily for clinical signs of neurologic disease. After twenty-one days the monkeys were killed, and the brains and spinla cords removed by conventional techniques for pathological study. The findings paralleled those previously reported for low-passage rubella-virus central-nervous system infections. There was no clinical evidence of neurologic disease. Sections of central-nervous system tissue, including lumbar and cervical enlargements of the spinal cord, medulla, pons, midbrain, cerebellum and cerebral hemispheres, failed to reveal any abnormality other than that resulting from the trauma of the inoculation procedure. Thus, no evidence for neuropathogenicity was found in monkeys inoculated with either high-passage or low-passage levels of rubella virus.

Another important consideration in the production of a vaccine is the antibody response of animals inoculated with the same since this is an indication of an immunologic affect. The antibody response of animals inoculated with seventy-fourth passage or seventy-seventh passage level rubella virus resembled those that followed infection with throat washings or third to twentieth tissue-culture passage preparations. Tests on serial serum samples from each group indicated that antibody was first detectable between the ninth and twentieth days after inoculation and increased to stable maximum titers by one or two months. Neutralizing-antibody titers ranged from 1:2 to ≥1:64, with a geometric means of 1:16. Regardless of virus-passage level, antibody titer persisted essentially unchanged for at least three or four months after infection.

Antibody induced by previous rubella-virus infection has been shown to protect monkeys against reinfection.

Table V presents data concerning the effect of rubella virus passage level or immunity to reinfection.

TABLE V

| | | Results of challenge | | | |
|---|---|---|---|---|---|
| | | Antibody increase | | Virus recovery | |
| Original infection virus-passage level [a] | Challenge inoculum [b] | Number positive | Number tested | Number positive | Number tested |
| 0 to 4 | 2.9 to 5.5 | 1 | 8 | 0 | 8 |
| 74 | 6.1 | 2 | 4 | 0 | 4 |

[a] Cell-culture passage level of rubella virus in African green monkey kidney cells.
[b] $Log_{10}$ tissue-culture interfering $dose_{50}$ of M-33 strain of rubella virus inoculated parentally.

Monkeys originally infected with high-passage and low-passage levels of virus were challenged intravenously or intramuscularly several months later with fourth-passage-level M-33 strain virus. Of 8 animals originally infected with low-passage virus, 7 with antibody titers of 1:4 to 1:64 showed no change in antibody level after challenge. In the remaining monkey with antibody detectable at a 1:2 serum dilution a sixteenfold increase in titer developed. Virologic studies on 4 animals immunized four or five months previously with seventy-fourth-passage virus and challenged intravenously with fourth-passage virus are summarized in the lower portion of Table V. Two, selected because of low pre-existing antibody levels (1:2 and 1:4), showed fourfold to sixteenfold increments in titer. The remaining animals, both with levels of 1:16 before challenge, did not show significant increases in antibody titer. Thus, challenge inoculation produced antibody increases only in animals with low levels of pre-existing antibody. It is of interest that despite parenteral challenge with $10^{2.9}$ to $10^{6.1}$ $InD_{50}$, rubella virus could not be recovered from animals with antibody resulting from prior inoculation with high passage or low-passage rubella virus. A total of 68 pharyngeal, nasopharyngeal, rectal and blood specimens collected after challenge from animals originally infected with low-passage virus were negative. Virus-isolation specimens obtained from the 4 monkeys previously infected with high-passage virus did yield virus after challenge inoculation. None of these respiratory or intestinal tract swabs or heparinized blood specimens collected at intervals of two or three days during the three weeks after challenge were positive for rubella virus. There was no transmission of infection from challenged animals to controls; none of 4 cage or 2 room control monkeys showed antibody.

The comparative studies performed in monkeys with low-passage and high-passage viruses provided confirmation of the attenuation indicated by the in vitro laboratory "marker" techniques. The infection produced in these animals by high-passage virus was drastically modified. Patterns of viremia, virus shedding and communicability characteristic of low-passage virulent virus are not seen with high-passage virus. These changes in experimental infections were not accompanied by development of neuropathogenicity. No evidence of pathologic changes in central-nervous system tissues was found in rhesus monkeys inoculated with either low- or high-passages of rubella virus.

The observation that animals immunized with high-passage rubella virus were protected against viremia and virus shedding by low-passage virulent virus was of particular interest. This protective effect was not influenced by antibody level. Monkeys with low titers of antibody had antibody responses but, as in animals with higher titers, did not shed virus and were not viremic. It seems probable that animals with detectable antibody would also be resistant to systemic infection under conditions of natural exposure. Since rubella-virus infections appear to be transmitted to the products of conception via the maternal bloodstream absence of viremia would be expected to preclude fetal infection and teratogenesis.

The alterations in the biologic characteriscs of high-passage rubella virus, including increased cytopathic effect and interferon induction in vitro and the production of immunogenic and yet noncommunicable infections in vivo, were similar to those of other successfully attenuated viruses. Based primarily on the evidence provided by the "marker" techniques as confirmed by the animal tests, clinical trials of an experimental live-virus vaccine based on the high-passage virus (HPV-77) were initiated, although based on experience with other attenuated virus vaccines, similar experiences can be expected at least with virus selected from passage levels 10 removed in either direction from the tested 77th passage material. It is believed that below about 67th passage level, the virus may not be sufficiently noncommunicable, evidencing the importance of such high passage level material.

Production and testing of vaccine conformed to the rigorous requirements applying to commercially produced live measles and poliovirus vaccines.

Cultures of GMK cells grown in 32-oz. (846-ml.) bottles were inoculated with the high-passage M-33 strain. Before the period of virus harvest Eagle's minimal essential medium containing 1 percent fetal bovine serum and antibiotics was removed by washing of the monolayers three times with 50 ml. of Hank's BSS. Cultures were then re-fed and maintained on serum-free M-199 containing 25 $\mu g$. per milliliter of neomycin as the only antibiotic. Daily harvests of infected fluids were made from the eighth to the fifteenth day after inoculation. Pooled fluids were centrifuged to remove intact cells. To the supernatant fluid commercially purchased, nonicterogenic, human serum albumin was added as a stabilizer to a final concentration of 2 percent. This seventy-seventh-GMK-passage material, after distribution in single dose containers, was frozen at $-60°$ C. and represented the final vaccine.

When thawed and assayed in cell cultures the vaccine was found to contain $10^{3.9}$ $TCD_{50}$ per 0.5 ml. of rubella virus. The vaccine has been stable under these conditions of storage for in excess of six months.

Clinical studies with rubella-virus preparations free of detectable extraneous agents pose little risk if susceptible persons are shielded from contact with those who have been vaccinated. Such carefully controlled conditions are best met in certain institutions. Here, the population is more stable than in the community at large, and the entry of personnel into a study area is subject to administrative control.

After careful evaluation of all pertinent factors, an institution having about 700 students residing in widely scattered cottages that are functionally independent was selected. These arrangements made it possible to isolate small groups of children from other rubella-susceptible persons with minimal interruption in the normal educational program. The immunity status of the 700 children and 300 employees was ascertained in advance by virus-neutralization tests.

Children were selected for participation in the study only after their parents or legal guardians had been fully acquainted with all details of the project and had given written permission.

In various studies a total of 34 susceptible girls were inoculated subcutaneously with 0.5 ml. of experimental vaccine containing approximately 10,000 $TCD_{50}$ of the live modified virus. The girls were maintained in separate cottages each containing about eight inoculated persons and eight uninoculated girls as contact controls. Each cottage was isolated from other rubella susceptible persons for from seven to eight weeks.

The children were examined daily, and their temperatures recorded twice daily for the seven or eight weeks' duration of the study. The types of specimens collected for virologic testing included throat swabs daily for fifty-two to fifty-seven days from both inoculated and uninoculated participants, heparinized whole-blood samples on frequent occasions between the sixth and twenty-first days from inoculated children and clotted blood for serologic examinations at weekly intervals for seven or eight weeks from all members of the study groups. Throat swabs and heparinized blood samples were used for attempted virus recovery and thus were frozen immediately in Dry Ice.

Throat swabs, originally collected and frozen in 6.0 ml. of Hank's BSS containing 1 percent BPA and antibiotics, were thawed and individually inoculated in 0.5 ml. volumes into each of 3 GMK culture tubes from which the medium had been removed. After a one-hour adsorption period, the inoculum was replaced with 1.0 ml. of maintenance medium, and the tubes were incubated at 35° C. Tests for interfering viruses were made after ten days, both in the original inoculated cultures and in a subpassage. Interfering agents were identified as rubella virus by neutralization tests with specific immune serum.

Heparinized blood samples were inoculated similarly. After one hour the blood was removed, and cultures washed twice before refeeding. Again, tests for presence of virus were made by the interference technique.

To quantitate the amount of virus present, positive throat swab or blood specimens were titrated in tenfold dilutions in GMK and continuous rabbit kidney ($RK_{13}$) tube cultures. Virus titers in GMK were expressed as the interfering $dose_{50}$ ($InD_{50}$), and titers in $RK_{13}$ as the cytopathic $dose_{50}$ ($TCD_{50}$).

Neutralization tests were performed in $RK_{13}$ tube cultures by methods previously described. Neutralizing-antibody titers were expressed as the twofold dilution of serum that protected 50 percent or more of cultures from rubella-virus cytopathic effect (CPE). Specimens that, in the initial 1:2 dilution, failed to neautralize virus were considered devoid of antibody.

Daily medical examinations for the test periods revealed no rash, vaccine-related fever or lymphadenopathy in any of the inoculated children.[8]

Figure 2:
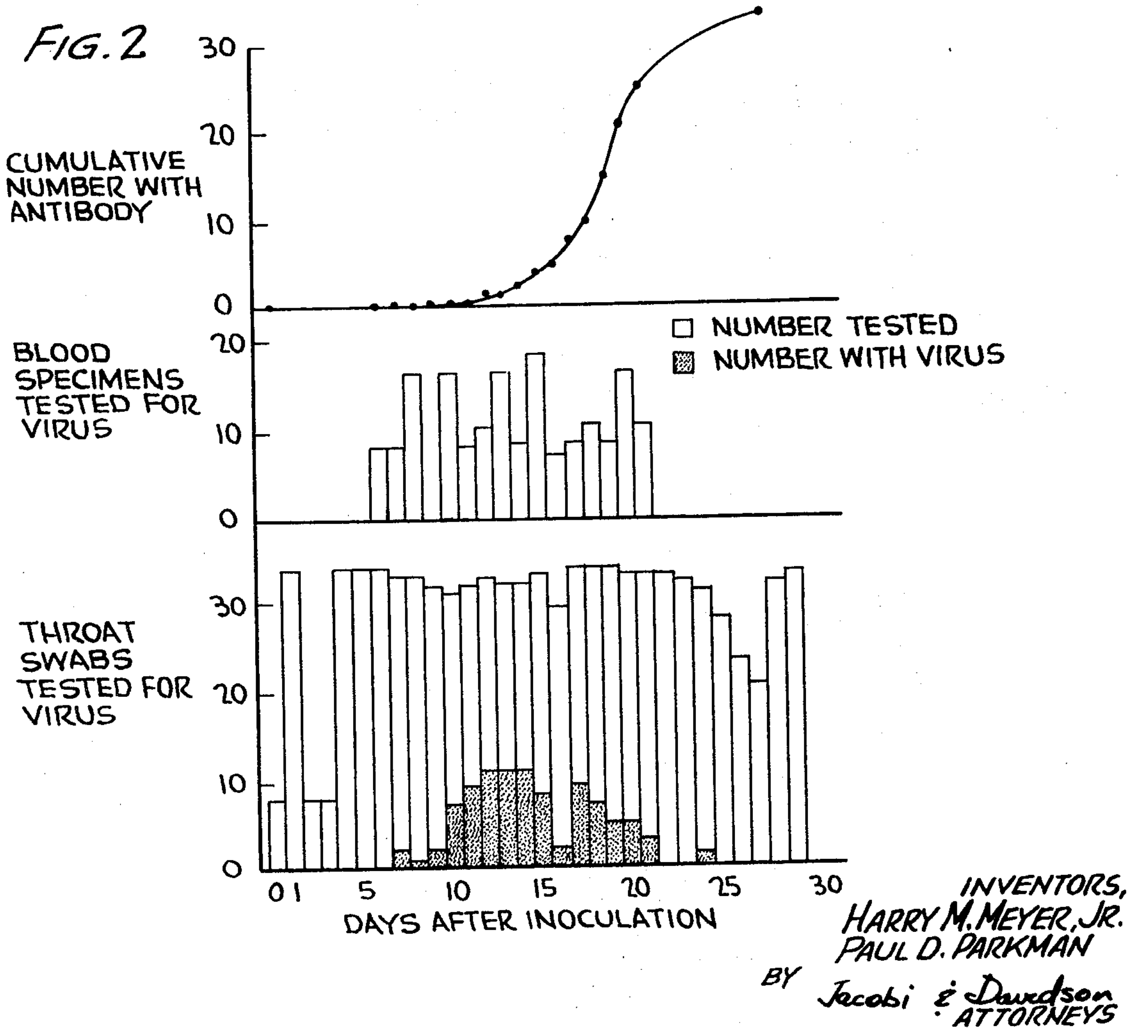
FIG. 2 is a graphic illustration summarizing the virologic events following the inoculation of a total of 34 susceptible children during the clinical trials of the vaccine of this invention.

FIG. 2 summarizes the virologic events after HPV–77 virus inoculation of the 34 susceptible children.

Neutralizing antibody was first detected in 1 child on the twelfth day; most had antibody by the twenty-first day after inoculation. Numerous attemps were made to detect viremia. Although 7 to 18 specimens collected daily from the sixth through the twenty-first days after inoculation were tested rubella virus was not recovered from the blood of any vaccinated child. Thus, none of 177 blood samples obtained from these children contained detectable virus.

The pattern of pharyngeal shedding of virus indicated that isolates may be made from a few children as early as the seventh to the ninth day but are far more common between the tenth and twentieth days. The latest positive throat swab was collected on the twenty-fourth day. Shedding of virus from the pharynx was frequently intermittent. Eleven of the 34 inoculated never shed detectable virus, and even during the period of maximum virus excretion, no more than 34 percent of swabs were positive on any given day. This pattern suggested that less virus is excreted in the attenuated virus infections that in virulent rubella.

[8] Only one child experienced any symptoms deserving special mention. In this ten-year old girl streptococcal pharyngitis associated with rash developed. The etiology of the infection was established by culture of Group A, β-hemolytic streptococci and demonstration of a rise in antistreptolysin-O antibody titer. These finding and the occurence of the rash only eight days after inoculation led to the conclusion that the illness was not related to the vaccine.

There was no communicability evidenced during the clinical trials. None of the susceptible cottage contacts of the vaccinated children developed antibody or shed virus during the observation period.

Figure 3:
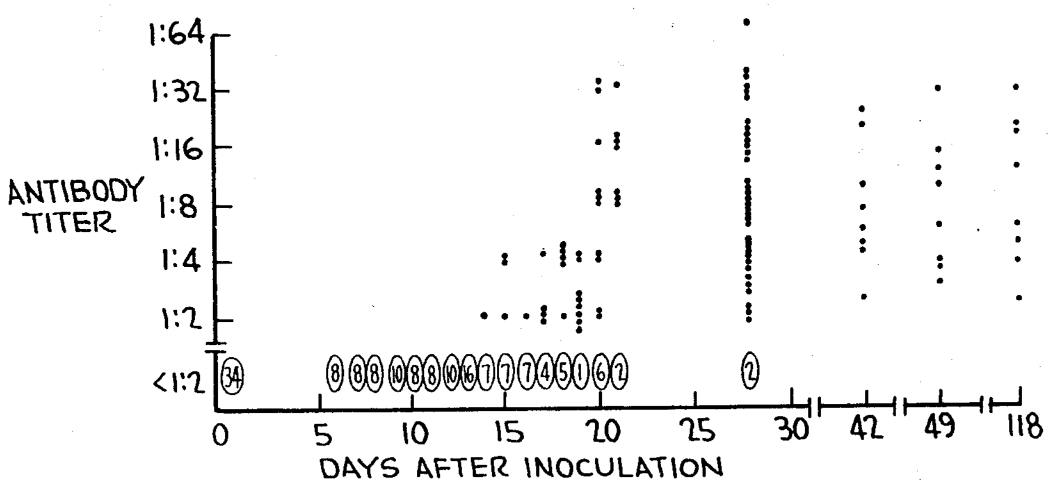
FIG. 3 shows the level and duration of neutralizing antibodies in the children inoculated during the clinical studies of the vaccine produced according to the instant inventive concepts.

The level and duration of neutralizing antibody are depicted in FIG. 3 wherein the circled figures represent the number of serum samples negative for antibody on the days specified. In 32 of 34 children, or 94 percent, neutralizing antibody developed by the twenty-eighth day after inoculation. Antibody titers averaged 1:8 and ranged from 1:2 to 1:64, four weeks after infection.

By chance it was possible to study a virulent outbreak of rubella-virus infection at the same institution, the outbreak being confined to a single cottage not involved in the vaccine study. The natural disease was studied with the same virologic methods used to evaluate the vaccine-induced infections.

One of the girls from this other cottage was exposed to a child with a rash outside of the institution and on her return, seventeen days after exposure, rubella developed. Ten other rubella-susceptible children were in the cottage; in the ensuing eight weeks all 10 were infected by the virulent rubella virus. There was no spread of the virus to persons outside the cottage.

The clinical features of natural rubella as compared to the infections produced by the attenuated virus are listed in Table VI.

TABLE VI

| Type of virus in cottage | Number of children— Infected | With rash | With inapparent infections |
|---|---|---|---|
| Virulent | 11 | 9 | 2 |
| HPV–77 | 8 | 0 | 8 |
| HPV–77 | 8 | 0 | 8 |
| HPV–77 | 8 | 0 | 8 |
| HPV–77 | 10 | 0 | 10 |

Of the 11 persons infected with virulent rubella during the outbreak, 9 experienced the typical disease with rash, and 2 had clinically inapparent infections. In contrast, none of the 34 rubella-susceptible children living in the test cottages had any symptoms of rubella after inoculation with high-passage virus.

Figure 4:
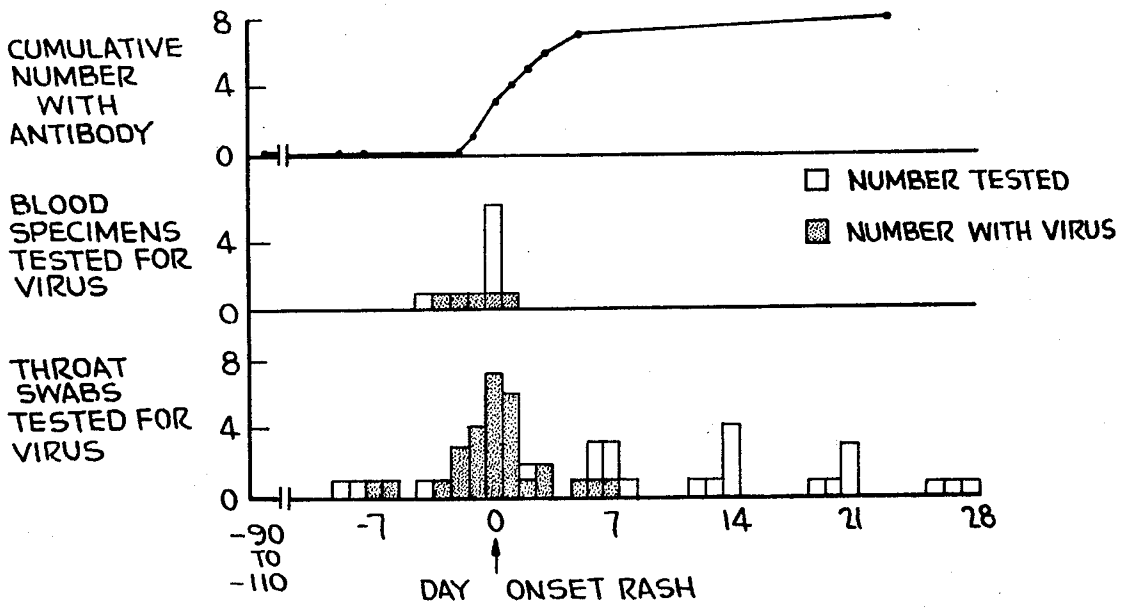
FIG. 4 shows comparative virologic events in an outbreak of natural rubella.

The results of virus studies in the cases of natural rubella are summarized in FIG. 4. There was a high efficiency of virus recovery from throat-swab specimens. During the period from seven days before the onset of rash to four days afterward, 26 of 28 throat swabs collected in 8 of the secondary cases with clinical rubella yielded virus. For several consecutive days 100 percent of swabs were positive. To demonstrate viremia, it is desirable to obtain blood samples during the period before the onset of rash. Of the 4 heparinized blood samples collected one to four days before the onset of rash 3 were definitely positive for rubella virus. This is a typical virologic picture of virulent rubella and stands in contrast to the experience with vaccinated children. In the attenauted-virus infection (FIG. 2) viremia was never shown, and on any given day not more than 34 percent of throat swabs were positive.

The outbreak of virulent rubella provided an opportunity to compare the communicability of natural and attenuated rubella infections in the particular environmental setting as shown in Table VII.

TABLE VII

| Type of virus in cottage | Number of— Susceptible contacts | Contacts infected |
|---|---|---|
| Virulent | [a] 10 | 10 |
| HPV-77 | [b] 8 | 0 |
| HPV-77 | [b] 7 | 0 |
| HPV-77 | [b] 8 | 0 |
| HPV-77 | [b] 7 | 0 |

[a] Original exposure to one patient with virulent rubella.
[b] Each group exposed to 8 to 10 children infected with HPV-77 rubella virus.

In the cottage having virulent virus, all of 10 susceptible persons exposed to the natural rubella were infected during the following eight weeks. In each of the other cottages, 6 to 10 vaccinated children infected with the attenuated virus lived with 7 or 8 susceptible playmates. None of these 30 intimate contacts were infected.

Because of the obvious differences in the communicability of the virulent and attenuated-virus infections, attempts were made to quantitate the amount of virus excreted. Thirteen virus-positive throat-swab specimens from the virulent-rubella outbreak and 22 positive throat swabs from vaccinated children infected with the attenuated virus were titrated in tissue cultures. The geometric mean titer of virus in swabs from the virulent cases was $10^{-2.5}$ per 0.1 ml., and that from the vaccinated children was only $10^{-0.4}$ per 0.1 ml., representing a hundred-fold difference—that is, 320 as compared to 2.5 infectious doses.

The laboratory "marker" tests that had indicated modification of the high passage virus were used to characterize the viruses excreted by the vaccinated children as will be seen below in Table VIII.

TABLE VIII

| Characteristics | Rubella-virus type: Virulent | HPV-77 | Isolate |
|---|---|---|---|
| In vitro: | | | |
| Cytopathic effect on $RK_{13}$ cells | 0 | + | + |
| Plaque formation in $RK_{13}$ cells | 0 | + | + |
| Interferon production | 0 to ± | + | + |
| In vivo (monkey): | | | |
| Viremia | + | 0 | 0 |
| Virus shedding | + | 0 to ± | 0 |
| Communicability | + | 0 | 0 |

A representative isolate from an inoculated girl was subjected to the entire gamut of tests. Each of the marker tests indicated that the isolate possessed the properties of the vaccine strain and not of virulent rubella virus. The isolate strain produced cytopathic changes (CPE) and plaques in $RK_{13}$ cultures and induced the production of interferon in vitro. Interferon titers in GMK cultures infected with the isolate were 1:13 as compared to less than 1:4 with low-passage virus. Five rhesus monkeys inoculated intravenously with the virus from the vaccinated girl were not viremic, did not shed virus and did not transmit their infections to uninoculated cagemates.

With the use of the $RK_{13}$ cytopathology marker 22 other representative pharyngeal isolates from 8 vaccinated children were compared with 16 isolates from the pharynx and blood of 4 children involved in the outbreak of virulent rubella. None of the viruses from the cases of natural rubella produced CPE in $RK_{13}$ cultures whereas all the strains from the vaccinated children did. Thus, the viruses recovered from vaccinated children uniformly exhibited the properties characteristic of the high-passage attenuated strain.

Continuing these investigations of qualitative differences, experiments were done to compare the infectivity of low-passage and high-passage rubella viruses in rhesus monkeys inoculated by the intranasal route. Tenfold dilutions of each virus were inoculated intranasally into groups of 5 susceptible monkeys. Infectivity end points of the 2 virus preparations were calculated on the basis of appearance of antibody in the animal as seen in Table IX.

TABLE IX

| Type of virus | Virus titer: In tissue culture | In monkeys intranasally inoculated | Intranasal infectivity (ratio of virulent to attenuated) |
|---|---|---|---|
| Virulent | [a] $10^{-4.5}$ | [a] $10^{-5.1}$ | 100:1 |
| Attenuated (HPV-77) | $10^{-4.6}$ | $10^{-3.1}$ | |

[a] Virus titer/ml.

Assay of the pools of virulent and attenuated virus in tissue cultures showed titers of $10^{-4.5}$ and $10^{-4.6}$ $TCD_{50}$ per 1.0 ml., respectively. After intranasal inoculation into monkeys the infectivity end points were $10^{-5.1}$ and $10^{-3.1}$, respectively, indicating that the attenuated strain was far less efficient than the virulent in inducing simian infection by the intranasal route.

Thus, it will now be seen that there is herein provided methods for the production of an attenuated, immunogenic, noncommunicable live virus rubella vaccine and laboratory techniques for indicating modification of the virulent virus. The general pattern of neutralizing-antibody response to infection with the high-passage virus of this invention resembles that observed in natural rubella. Many studies have established that the presence of rubella neutralizing antibody prevents both clinical and subclinical infections in man and experimentally inoculated monkeys. Thus, it seems likely that children infected with the attenuated virus will be immune to the disease. The absence of communicability in studies with 34 vaccinated and 30 control children in 4 different cottages is significant. In general, institutionalized children experience high attack rates with communicable disease as a reflection of conditions of intimate contact. The natural rubella outbreak in which 100 percent of susceptible children were infected demonstrates the high secondary attack rate of rubella-virus infections under these circumstances.

The quantitative difference in the virus-excretion patterns of virulent and attenuated rubella infections may well be important in explaining the lack of communicability observed with the latter. On the basis of tissue-culture assay data it appears that about a hundred times more virus is shed in natural rubella. Even if infection were transmitted from a vaccinated child to an uninoculated person there seems to be less risk that further spread would result. The results of laboratory "marker" tests indicated that the properties of the viruses excreted by the vaccinated subjects were the same as those of the attenuated strain. It seems likely that a secondary infection, if it occurred, would also be attenuated and relatively noncommunicable.

The qualitative differences in the attenuated and virulent viruses shown by the intranasal inoculation of monkeys extend the theoretical margin of safety.

Since there are modifications of the instant inventive concepts which will be obvious to those skilled in the art, all matter herein is to be considered illustrative and no in a limiting sense unless otherwise identified.

What is claimed is:

1. A method for preparing an attenuated live rubella virus comprising the steps of introducing a virulent live rubella virus into a monkey kidney tissue cell culture, incubating said tissue culture at a temperature compatible with growth of said tissue and said virus, harvesting at least a portion of the virus so-produced and reintroducing said harvested virus into fresh cultures of the selected tissue, and repeating such tissue culture passages of the virus serially for a sufficient number of passages to produce an antigenically active, noncommunicable, live rubella virus.

2. The method of claim 1 wherein said tissue culture passages are repeated serially through at least about 67 passages, and including the step of forming a vaccine from such high passage virus.

3. The method of claim 2 wherein said virus is of the M–33 rubella strain and said tissue culture passages are repeated serially through about 77 passages.

4. A method for preparing an attenuated live rubella virus vaccine comprising the steps of introducing a virulent live rubella virus into a primary African green monkey kidney cell culture, incubating said tissue culture at about 35° C., harvesting at least a portion of the virus so-produced at approximately 7 to 19 day intervals and reintroducing said harvested virus into fresh primary African green monkey kidney cell cultures, repeating such tissue culture passages of the virus serially for between about 67 and 87 passages, and concentrating such high passage virus to form a vaccine therefrom.

5. The method of claim 4 whereas said rubella virus is of the M–33 strain and said tissue culture passages are repeated serially for about 77 passages.

6. The method of claim 4 wherein said rubella virus is of the ML strain.

7. A process for producing an attenuated live rubella virus which comprises the steps of introducing a virulent live rubella virus into a monkey kidney tissue cell culture, incubating said tissue culture at a temperature compatible with the growth of said tissue and said virus, harvesting at least a portion of the virus so produced, reintroducing said harvested virus into fresh culture of the tissue, and repeating such tissue culture passage for a sufficient number of pasages to produce an antigenically-active, non-communicable, live rubella virus.

8. An attenuated live rubella virus vaccine containing an effective quantity of an antigenically-active, non-communicable, live rubella virus produced by introducing a virulent live rubella virus into a monkey kidney cell culture incubating said tissue culture at about 35° C., harvesting at least a portion of the virus so prodced at approximately 7 to 10 day intervals and reintroducing said harbested virus into fresh cell cultures of the same type, repeating such tissue culture pasages of the virus serially for at least 50 passages, and concentrating the resulting viruses to form a vaccine therefrom.

References Cited

UNITED STATES PATENTS 3,401,084 9/1968 Buynak et al. -------- 195—1.3

RICHARD L. HUFF, Primary Examiner

U.S. Cl. X.R.

195—1.3